United States Patent
Ailor, III

(10) Patent No.: US 7,557,753 B2
(45) Date of Patent: Jul. 7, 2009

(54) SPACECRAFT HARDWARE TRACKER

(75) Inventor: William H. Ailor, III, Palos Verdes Estates, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 11/796,753

(22) Filed: Apr. 30, 2007

(65) Prior Publication Data

US 2008/0266173 A1  Oct. 30, 2008

(51) Int. Cl.
*H04B 7/185* (2006.01)
*G01S 1/04* (2006.01)
*B64G 3/00* (2006.01)
*G01S 1/00* (2006.01)
*B64G 1/00* (2006.01)
*B64G 1/22* (2006.01)

(52) U.S. Cl. ............. 342/463; 342/357.01; 342/357.06; 342/357.07; 342/450; 342/451; 342/465; 701/200; 701/207; 701/213; 244/1 R; 244/158.1; 244/158.9

(58) Field of Classification Search ................. 244/3.1, 244/158.1, 158.8, 1 R, 158.9, 159.1, 159.2, 244/164–171; 342/42–51, 62, 175, 195, 342/450–465, 352, 385, 386, 357.01–357.17; 455/91, 95, 98; 701/1–18, 200, 207–226
See application file for complete search history.

(56) References Cited

U.S. PATENT DOCUMENTS

| | | | | |
|---|---|---|---|---|
| 4,777,656 | A * | 10/1988 | Wade | 455/98 |
| 5,367,306 | A * | 11/1994 | Hollon et al. | 342/386 |
| 5,517,199 | A * | 5/1996 | DiMattei | 342/357.09 |
| 5,519,403 | A * | 5/1996 | Bickley et al. | 342/352 |
| 6,058,338 | A * | 5/2000 | Agashe et al. | 244/158.8 |
| 6,388,617 | B1 * | 5/2002 | Flood et al. | 342/386 |
| 6,564,146 | B1 * | 5/2003 | Meyer et al. | 342/62 |
| 6,895,314 | B2 * | 5/2005 | Ailor et al. | 244/158.1 |
| 2004/0087284 | A1 * | 5/2004 | Street | 342/385 |
| 2005/0073458 | A1 * | 4/2005 | Street | 342/385 |

OTHER PUBLICATIONS

M. Wade, entry in "Encyclopedia Astronautica" for "Shenzhou", posted on the Internet at astronautix.com; no date listed; copyright 1997-2007.*
"Independent Oversight . . . Solid Rocket Boosters"; no author listed; no date given; posted on the Internet at science.ksc.nasa.gov.*
Internet Page titled "System Concept" on the website cospas-sarsat.org; no author listed; no date given.*

* cited by examiner

*Primary Examiner*—Bernarr E Gregory
(74) *Attorney, Agent, or Firm*—Derrick Michael Reid

(57) ABSTRACT

A GPS tracker is disposed on launch hardware that separates from a spacecraft launch vehicle during ascent to orbit with the launch hardware having a suborbital trajectory from launch to impact while being tracked so as to track the launch hardware during suborbital flight, such as for tracking separated fuel stages, external tanks, external boosters, and payload fairings that return to earth.

17 Claims, 1 Drawing Sheet

LAUNCH HARDWARE TRACING SYSTEM

LAUNCH HARDWARE TRACING SYSTEM

LAUNCH HARDWARE TRACKER

SPACECRAFT HARDWARE TRACKER

STATEMENT OF GOVERNMENT INTEREST

The invention was made with Government support under contract No. FA8802-04-C-0001 by the Department of the Air Force. The Government has certain rights in the invention.

FIELD OF THE INVENTION

The invention relates to the field of tracking systems. More particularly, the present invention relates to tracking systems for tracking the trajectory of spent fuel stages of launch spacecraft.

BACKGROUND OF THE INVENTION

Precise information on the impact location of spacecraft launch hardware is required to calibrate preflight hazard predictions. Launch hardware include nonessential orbital spacecraft hardware such as nose fairings and fuel stages that are separated from the spacecraft and do not reach orbit, but return to earth along a hardware trajectory. Launch hardware impact data is required to recover expended launch hardware or test equipment. Ground-based sensors are limited in ability to obtain the impact location for hardware that impact outside of monitoring ranges. At present, launch vehicles collect data and maintain communications with ground stations for the portion of the flight where the launch vehicles are in view of the stations. Launch hardware is tracked during ascent by ground-based tracking systems. Communications and tracking on suborbital stages and payload fairings ends when the expended fuel stage or fairing has completed the launch mission when the launch hardware is released from the launching vehicle, and passes out of the view of ground-based tracking systems. Impact locations for expended launch hardware continue to be of interest for safety reasons and for potential reuse of the expended hardware.

Prior to launch, estimates are made as to where the expended hardware will land. Safety regulations specify that this hardware must land in a safe area, away from land masses or critical structures such as oil drilling platforms. The launch trajectory is adjusted to assure that safety requirements are met. Because the expended launch hardware is not tracked to impact, no data is available to verify that the hardware actually impacts in the predicted impact area. A system for returning information on the precise location of impact of a statistically significant number of expended stages and hardware is desired.

In addition, a cost-effective technique for acquiring aerodynamic heating rates on a large number of ascending launch vehicles are required to verify and possibly modify the thresholds for release of the launch hardware such as the fairings that protect payloads from atmospheric influences during launch. Imprecise estimations and the lack of precise launch data results in higher altitude of launch hardware and fairing releases, thereby increasing the mass of payloads carried to orbit by as much as 5 to 10%.

Tracking systems have been developed for commercial trucks, trains, and other modes of transportation. These systems collect GPS data on the vehicular location and return tracking information via satellite to a collection point. These systems typically draw power and data from the host vehicle. The weight and expense of existing tracking systems and services from a host increases the cost for launch systems rendering tracking systems expensive and impractical for inclusion on many launch vehicles. Electrical systems are not normally disposed on separated fuel stages, which disadvantageously create potentials for accidental fuel leakage and explosions, and hence, are not placed on fuel stages. These and other disadvantages are solved or reduced using the invention.

SUMMARY OF THE INVENTION

An object of the invention is to provide a tracker for tracking launch hardware.

Another object of the invention is to provide a tracker for tracking launch hardware that does not reach orbit.

Yet another object of the invention is to provide a system for tracking launch hardware that does not reach orbit using GPS positioning.

Still another object of the invention is to provide a tracker attached to launch hardware for tracking the launch hardware during suborbital flight.

The invention is directed to a tracker attached to launch hardware for tracking suborbital launch hardware during flight that may extend from launch to impact. The launch hardware includes, for example, fairings and spent fuel stages. Fuel stages include in-line fuel stages, external fuel tanks, and external solid rocket boosters. A large number of different launch vehicles can be equipped with lightweight, autonomous tracking devices that require only attachment, but no other services from a launch vehicle.

The tracker preferably has a power supply, GPS receiver, data collection recorder, and communications transmitter so as to be able to track launch hardware from launch to impact. These and other advantages will become more apparent from the following detailed description of the preferred embodiment.

DETAILED DESCRIPTION OF THE PREFERRED EMBODIMENT

Figure 1:
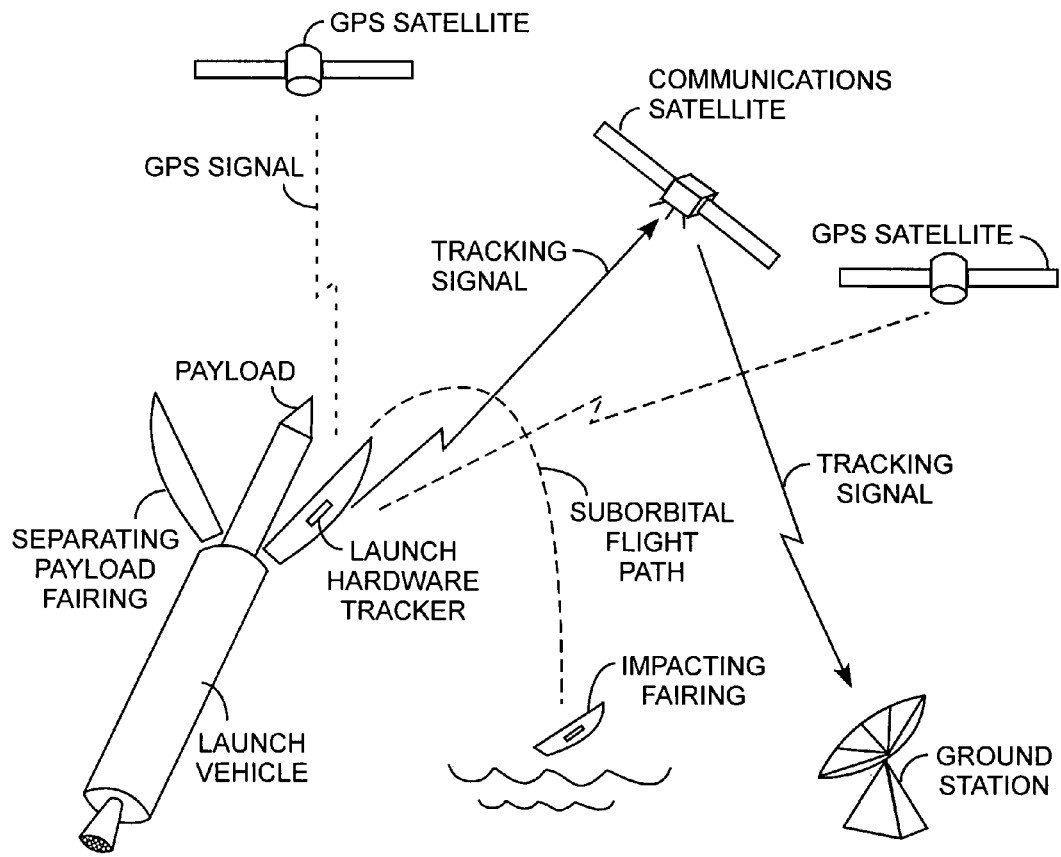
FIG. 1 is a diagram of a launch hardware tracking system.

An embodiment of the invention is described with reference to the figures using reference designations as shown in the figures. Referring to FIG. 1, a launch vehicle is launched in view of several GPS satellites. A Lunch hardware tracker is attached to a payload fairing. The launch hardware tracker communicates tracking information to a communication satellite that relays the tracking signals to a ground station. The launch hardware has a suborbital flight path from time of launch to time of separation to time of impact on the earth.

Figure 2:
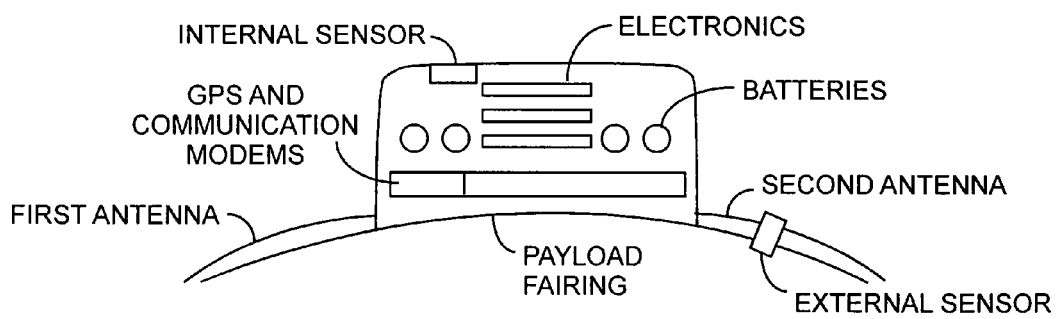
FIG. 2 is a diagram of a launch hardware tracker.

Referring to FIGS. 1 and 2, the launch hardware tracker is a small, lightweight, autonomous package that attaches to a launch vehicle stage, payload fairing, or other launch hardware, such as a spent fuel stage. The tracker includes a battery and requires no electrical power or other services from the host launch vehicle. The launch hardware tracker collects GPS signals and sensor data during launch and transmits tracking signals to the communications satellites. The tracker senses data and communicates tracking signals data before and after the launch hardware separates from the launch vehicle. Data is transmitted by a commercially available satellite communications link to a data collection terminal at a remote ground location.

The tracker contains a power supply such as batteries, necessary electronics that control the communications and store and process incoming data from sensors including an internal sensor and an external sensor. The tracker receives GPS signals using a modem compatible with the GPS system and sends data via a modem compatible with the commercial communications system. The tracker includes an antenna for receiving GPS signals from GPS satellites in view and communicating with the communication satellites. There can be a plurality of antenna such as a first antenna and a second antenna for improving GPS signal reception and tracking signal transmission. The external sensors include temperature and heating rate sensors that communicate to the tracker through wired or wireless technology, not shown. The tracker may be mounted either on internal struts of the launch hardware for improved environmental protection or to an external surface. The antenna is normally located on the external surface, but may be mounted internally when communications through the surface material enables acceptable GPS reception and tracking signal transmission.

The invention is directed to a tracker for tracking separated launch hardware during a suborbital flight of the launch hardware. The tracker includes a GPS receiver and modem for communicating flight path data to a communications satellite for tracking of the launch hardware. The tracker may further include sensors for sensing environmental conditions of the launch hardware. Those skilled in the art can make enhancements, improvements, and modifications to the invention, and these enhancements, improvements, and modifications may nonetheless fall within the spirit and scope of the following claims.

What is claimed is:

1. A system for receiving GPS signals and providing tracking signals during a suborbital flight path, the system comprising,
    launch hardware being part of a spacecraft having a launch vehicle portion for launching into orbit, the launch hardware coupled to the launch vehicle portion, the launch hardware having a suborbital flight path, and
    a tracking device coupled to the launch hardware, the tracking device receiving the GPS signals from GPS satellites and providing tracking signals to a communications satellite for tracking the launch hardware during the suborbital flight path.

2. The system of claim 1 wherein,
    the launch hardware is a payload fairing.

3. The system of claim 1 wherein,
    the launch hardware is a fuel stage.

4. The system of claim 1 wherein,
    the launch hardware is an external tank.

5. The system of claim 1 wherein,
    the launch hardware is a solid rocket booster.

6. The system of claim 1 wherein,
    the launch hardware is a reusable solid rocket booster.

7. The system of claim 1 wherein the tracker comprises,
    a modem for receiving GPS signals and transmitting the tracking signals.

8. The system of claim 1 wherein,
    the launch hardware is a reusable liquid rocket booster.

9. The system of claim 1 wherein the tracker comprises,
    a modem for receiving GPS signals and transmitting the tracking signals, and
    a battery for supplying power to the modem.

10. The system of claim 1 wherein the tracker comprises,
    a data recorder for recording flight path data.

11. The system of claim 1 wherein the tracker comprises,
    a sensor for sensing excitations, and
    a data recorder for recording sensing excitations.

12. The system of claim 1 wherein the tracking device comprises,
    a sensor for sensing excitations,
    a data recorder for recording sensing excitations and flight path data, and
    a modem for receiving GPS signals and transmitting the tracking signals and recorded sensing excitations and recorded flight path data.

13. The system of claim 1 wherein,
    the tracking device provides tracking data during an initial launch phase when the tracking device is rigidly coupled to the launch vehicle.

14. The system of claim 1 wherein,
    the tracking device provides a tracking signal after an initial launch phase when the launch hardware is separated from the launch vehicle.

15. The system of claim 1 wherein,
    the tracking device provides the tracking signal after an initial launch phase when the launch hardware is separated from the launch vehicle until impact of the launch hardware.

16. The system of claim 1 wherein,
    the tracking device provides the tracking signal after the launch vehicle impacts earth.

17. The system of claim 1 wherein,
    the communications system relays the tracking signals to a ground station.

* * * * *